(12) United States Patent
Lin

(10) Patent No.: US 9,313,256 B2
(45) Date of Patent: Apr. 12, 2016

(54) APPARATUSES AND METHODS FOR PLUG-IN MANAGEMENT

(71) Applicant: Tencent Technology (Shenzhen) Company Limited, Shenzhen, Guangdong (CN)

(72) Inventor: Xiaodan Lin, Guangdong (CN)

(73) Assignee: TENCENT TECHNOLOGY (SHENZHEN) CO., LTD., Shenzhen (CN)

( * ) Notice: Subject to any disclaimer, the term of this patent is extended or adjusted under 35 U.S.C. 154(b) by 253 days.

(21) Appl. No.: 14/152,371

(22) Filed: Jan. 10, 2014

(65) Prior Publication Data

US 2014/0129682 A1 May 8, 2014

Related U.S. Application Data

(63) Continuation of application No. PCT/CN2013/085345, filed on Oct. 16, 2013.

(30) Foreign Application Priority Data

Oct. 30, 2012 (CN) .......................... 2012 1 0424199

(51) Int. Cl.
*G06F 15/16* (2006.01)
*H04L 29/08* (2006.01)
(Continued)

(52) U.S. Cl.
CPC ............ *H04L 67/02* (2013.01); *G06F 9/44526* (2013.01); *H04L 67/2842* (2013.01); *H04W 4/003* (2013.01); *H04L 67/2857* (2013.01)

(58) Field of Classification Search
USPC ......... 709/201, 202, 203, 206, 217, 219, 223, 709/224, 226, 228, 232, 238; 705/43, 59; 713/300; 345/418; 455/41.1
See application file for complete search history.

(56) References Cited

U.S. PATENT DOCUMENTS 7,657,762 B2 * 2/2010 Orr ........................ G06F 1/3203
713/300
7,739,355 B2 * 6/2010 Brunninger ........... G06F 3/1204
709/217

(Continued)

FOREIGN PATENT DOCUMENTS

CN 101360068 A 2/2009
CN 101510156 A 8/2009

OTHER PUBLICATIONS

International Search Report and Written Opinion issued Jan. 16, 2014 in International Application No. PCT/CN2013/085345.

*Primary Examiner* — Quang N Nguyen
(74) *Attorney, Agent, or Firm* — Brinks Gilson & Lione

(57) ABSTRACT

A plug-in management apparatus for managing plug-ins installed in application programs may comprise a local plug-in management module disposed in a client device. The local plug-in management module may be configured to detect a plug-in installed in an application program; determine an activation status of the plug-in; and when the plug-in is active, turn off the plug-in when the plug-in has been in an idle condition for a time longer than a predetermined idle time. The local plug-in management module may also be configured to delete a plug-in when an activation frequency of the plug-in is lower than a predetermined frequency; clean a plurality of caches used by the plug-in when a quantity of the plurality of caches is greater than a pre-determined cache quantity or when the plug-in has been activated for a time longer than a predetermined activation time.

16 Claims, 5 Drawing Sheets

(51) Int. Cl.
*G06F 9/445* (2006.01)
*H04W 4/00* (2009.01)

(56) References Cited

U.S. PATENT DOCUMENTS

| | | | |
|---|---|---|---|
| 7,747,785 B2* | 6/2010 | Baker, III | G06Q 10/107 709/206 |
| 8,126,957 B2* | 2/2012 | Gowen | G06F 9/44526 709/202 |
| 8,234,660 B2* | 7/2012 | Ari | H04L 41/20 709/201 |
| 8,245,076 B2* | 8/2012 | Schindel, Jr. | G07F 19/20 705/43 |
| 8,438,561 B2* | 5/2013 | Itoh | G06F 8/61 705/59 |
| 8,947,423 B2* | 2/2015 | Ocali | G06T 1/00 345/418 |
| 2011/0154212 A1* | 6/2011 | Gharpure | G06F 17/30867 709/219 |
| 2011/0237187 A1* | 9/2011 | Yoneda | H04L 67/34 455/41.1 |
| 2014/0195589 A1* | 7/2014 | Devereaux | H04L 65/605 709/203 |

* cited by examiner

APPARATUSES AND METHODS FOR PLUG-IN MANAGEMENT

PRIORITY STATEMENT

This application is a continuation of International Application No. PCT/CN2013/085345, filed on Oct. 16, 2013, in the State Intellectual Property Office of the People's Republic of China, which claims the benefit of Chinese Patent Application No. 2012104241991, filed on Oct. 30, 2012, the disclosures of both of which are incorporated herein in their entirety by reference.

FIELD

The present disclosure relates generally to the field of mobile communication technologies. Specifically, the present disclosure relates to apparatuses and methods for plug-in management in mobile terminals.

BACKGROUND

Along with the development of mobile communication technologies, more and more users are having their own mobile terminals such as smart phones, panel computers, etc., through which users communicate and share information.

To meet increasing demands from users, service provides have developed various application software and plug-ins for the convenience in user experience. Nevertheless, ordinary users only know how to install plug-ins according to system suggestions and/or requirements. They know less about how to manage the said plug-ins and how to delete unnecessary plug-ins. As plug-ins in an application increase, the operating speed of the application becomes increasingly slower, the storage space occupied by the application becomes increasingly larger, and the power consumption of the mobile terminal becomes increasingly higher.

SUMMARY OF THE INVENTION

The present disclosure relates to apparatuses and methods for managing and optimizing plug-ins used in mobile terminals.

According to aspects of the present disclosure, a plug-in management apparatus may comprise a local plug-in management module disposed in a client device for managing plug-ins installed in an application program. The local plug-in management module may comprise a plug-in installation detection unit for detecting plug-ins installed in the application program; a plug-in process detection unit for detecting plug-ins being run in the application program; and a management unit configured to tabulate the plug-ins installed in the application program and the plug-ins being run in the application program, and to receive external management commands.

According to aspects of the present disclosure, a plug-in management apparatus may comprise a local plug-in management module disposed in a client device. The local plug-in management module may be configured to detect a plug-in installed in an application program; determine an activation status of the plug-in; and when the plug-in is active, turn off the plug-in when the plug-in has been in an idle condition for a time longer than a predetermined idle time. The local plug-in management module may also be configured to delete a plug-in when an activation frequency of the plug-in is lower than a predetermined frequency; clean a plurality of caches used by the plug-in when a quantity of the plurality of caches is greater than a pre-determined cache quantity or when the plug-in has been activated for a time longer than a predetermined activation time.

According to aspects of the present disclosure, a method for managing plug-ins installed in a mobile terminal may comprise detecting, by a plug-in management module, a plug-in being installed in an application program of a mobile terminal, wherein the plug-in management module may be disposed in the mobile terminal; determining, by the plug-in management module, an activation status of the plug-in; and when the plug-in is active, turning off, by the plug-in management module, the active plug-in when the plug-in has been in an idle condition for a time longer than a predetermined idle time. Additionally, the method may further comprise determining, by the plug-in management module, an activation frequency of the plug-in; and deleting, by the plug-in management module, the plug-in when the activation frequency of the plug-in is lower than a predetermined frequency. The method may further comprise cleaning, by the plug-in management module, a plurality of caches used by the plug-in when a quantity of the plurality of caches is greater than a pre-determined cache quantity or when the plug-in has been activated for a time longer than a predetermined activation time.

BRIEF DESCRIPTION OF THE DRAWINGS

The above and other features and advantages of the present disclosure will become more apparent by describing in detail example embodiments thereof with reference to the attached drawings in which.

DETAILED DESCRIPTION

Figure 1:
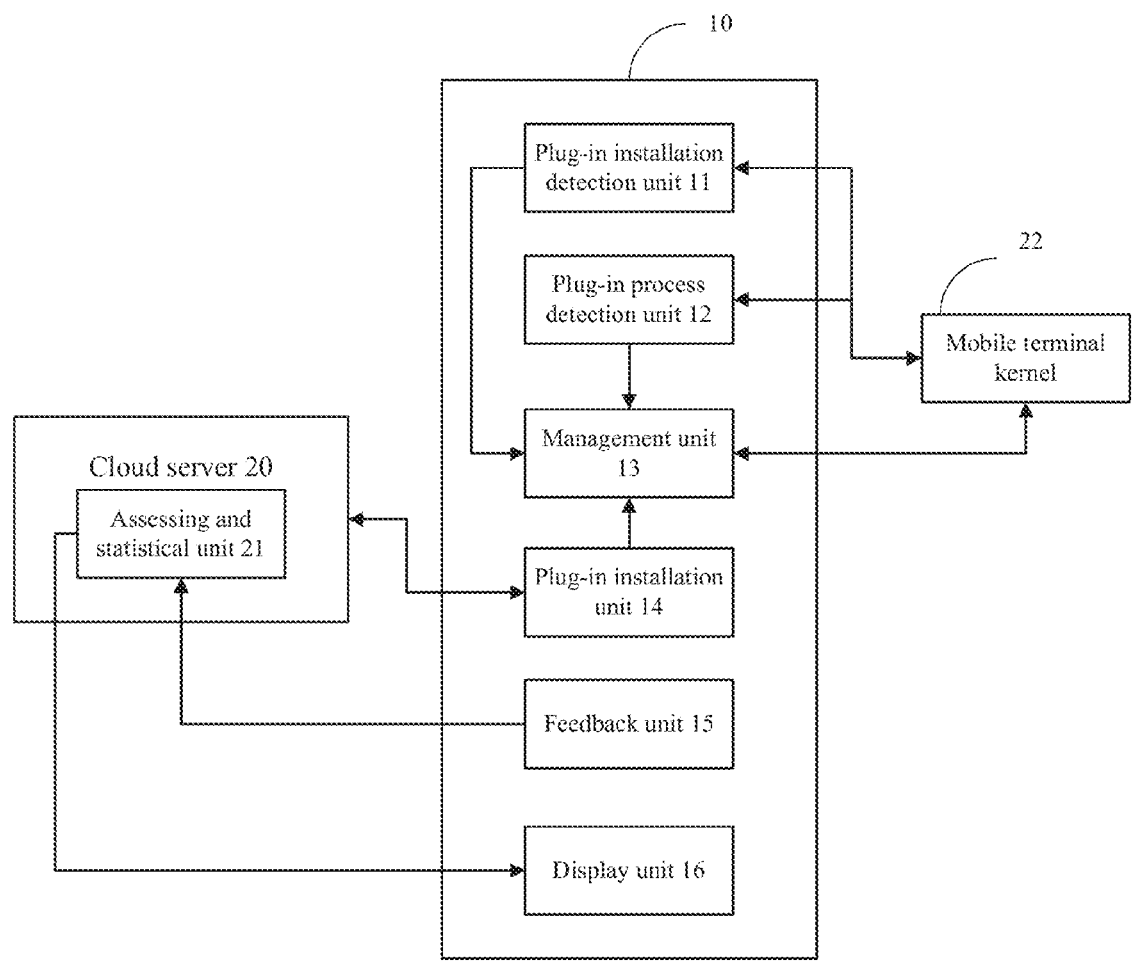
FIG. 1 is a structural block diagram of a plug-in management apparatus according to example embodiments of the present disclosure.

Example embodiments will now be described more fully with reference to the accompanying drawings, in which the example embodiments are shown. The example embodiments may, however, be embodied in many different forms and should not be construed as being limited to the example embodiments set forth herein; rather, the example embodiments are provided so that this Application will be thorough and complete, and will fully convey the concept of the invention to one skilled in the art. The drawings may be exaggerated for clarity and not necessarily in scale. Like reference numerals in the drawings denote like elements, and thus, their description will not be repeated. Words related to direction used in the present disclosure, e.g., "above", "below", "front", "back", "left", "right", "inside", and "outside", are with reference to the directions of the accompanying drawings. Accordingly, those words related to directions are intended for the illustration and understanding of the present disclosure, and not for limiting the scope thereof.

Figure 4:
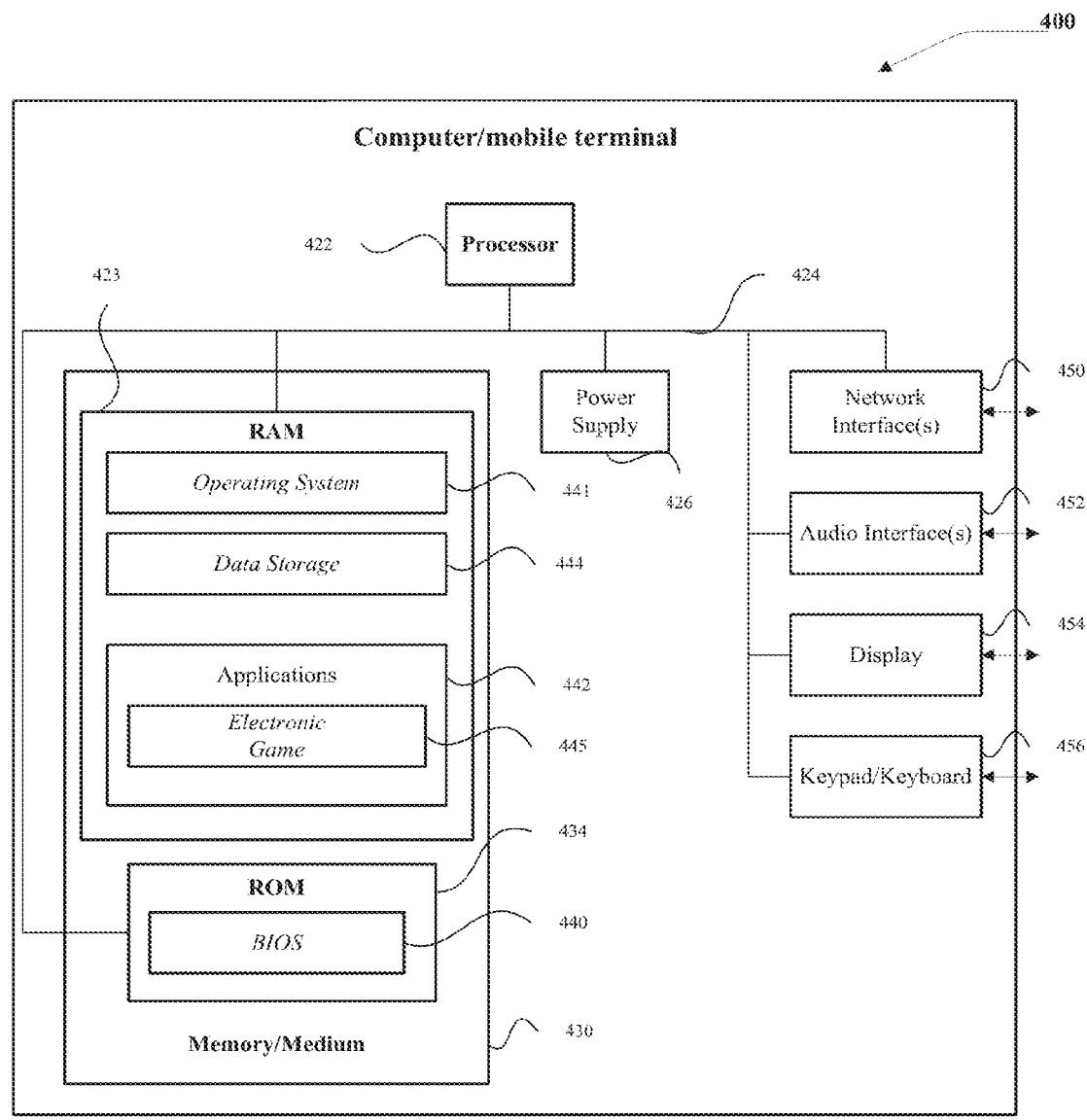
FIG. 4 is a schematic diagram illustrating an example embodiment of a computer and/or a mobile terminal.

FIG. 4 is a schematic diagram illustrating an example embodiment of a computer/mobile terminal that may comprise apparatuses to execute methods and software systems of the present disclosure. A computer/mobile terminal device 400 may be a computing device capable of executing a software system. The computer/mobile terminal device 400 may, for example, be a device such as a personal desktop computer or a portable device, such as a laptop computer, a tablet computer, a cellular telephone, or a smart phone. The computer/mobile terminal device 400 may also be a server (e.g., a cloud server) that connects to the above devices locally or via a network.

The computer/mobile terminal device 400 may vary in terms of capabilities or features. Claimed subject matter is intended to cover a wide range of potential variations. For example, the computer/mobile terminal device 400 may include a keypad/keyboard 456. It may also comprise a display 454, such as a liquid crystal display (LCD), or a display with a high degree of functionality, such as a touch-sensitive color 2D or 3D display. In contrast, however, as another example, a web-enabled computer/mobile terminal device 400 may include one or more physical or virtual keyboards, and mass storage medium 430.

The computer/mobile terminal device 400 may also include or may execute a variety of operating systems 441, including an operating system, such as a Windows™ or Linux™, or a mobile operating system, such as iOS™, Android™, or Windows Mobile™. The computer/mobile terminal device 400 may include or may execute a variety of possible applications 442, such as an electronic game 445. An application 442 may enable communication with other devices via a network, such as communicating with another computer via an Internet network for online electronic games.

Further, the computer/mobile terminal device 400 may include one or more non-transitory processor-readable storage media such as a memory/medium 430 and one or more processors 422 in communication with the non-transitory processor-readable storage media. For example, the non-transitory processor-readable storage media may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media may store sets of instructions, or units and/or modules that comprise the sets of instructions, for conducting operations described in the present disclosure. Alternatively, the units and/or modules may be hardware disposed in the computer/mobile terminal device 400 configured to conduct operations described in the present disclosure. The one or more processors may be configured to execute the sets of instructions and perform the operations in example embodiments of the present disclosure.

FIG. 1 is a structural block diagram of a plug-in management apparatus according to an example embodiment of the present disclosure. A plug-in may be a software component that adds one or more specific features to a software application. When a software application supports plug-ins, the software application enables customization.

The plug-in management apparatus may comprise a local plug-in management module 10 disposed and/or installed in a client device (e.g., a mobile terminal having a processor) for managing plug-ins installed in an application program. The client device may be the computer/mobile terminal device 400. The local plug-in management module may be hardware disposed in the client device. The local plug-in management module may also be a software application stored in a storage medium of the client device and may be executed by the client device. The local plug-in management module 10 may comprise a plug-in installation detection unit 11, a plug-in process detection unit 12 and a management unit 13.

The plug-in installation detection unit 11 may be configured to detect plug-ins installed in application programs by detecting identifications (IDs) of programs and IDs of plug-ins installed in these programs (each application program may have a unique name ID and each plug-in may have a unique name ID) through a program manager in a kernel of a mobile terminal The plug-in process detection unit 12 may be configured to determine that plug-ins that are being run in the application programs (i.e., the plug-ins are active) by detecting operation IDs of the plug-ins (each plug-in may have a unique operation ID for all running processes, including plug-in processes) in a task manager of the mobile terminal kernel. The management unit 13 may be configured to tabulate the plug-ins installed in the application programs and the plug-ins being run by the application programs (i.e., active plug-ins). The management unit 13 may also be configured to receive external management commands. The above data collected by the plug-in installation detection unit 11, the plug-in process detection unit 12, and the management unit 13 may be displayed in an interface of the plug-in management apparatus.

Program manager is application performance monitoring software that manages tasks and performance of all running programs, to ensure high availability and performance for the running programs by ensuring the running programs have high uptime. The task manager is a system monitoring program used to provide information about the processes and programs running on a computer, as well as the general status of the computer.

According to an example embodiment of the present disclosure, the plug-in management apparatus may use the plug-in installation detection unit 11 to detect plug-ins installed in the corresponding application programs through the IDs (e.g., name IDs) of the application programs and the IDs of the plug-ins. The plug-in management apparatus may use the plug-in process detection unit 12 to detect active plug-ins being run by the corresponding application programs. Additionally, the plug-in management apparatus may use the management unit 13 to tabulate the plug-ins installed and the plug-ins being run. Further, the plug-in management apparatus may also comprise an interface (not shown), displaying data and/or conditions about the plug-ins and the corresponding application programs, so that it is easy for a user to recognize what plug-ins are installed and what plug-ins are active in a mobile terminal. The interface may also be configured to receive external management commands (e.g., from a user) to manage the installation, operation, and/or deletion of the plug-ins in the mobile terminal.

Figure 2:
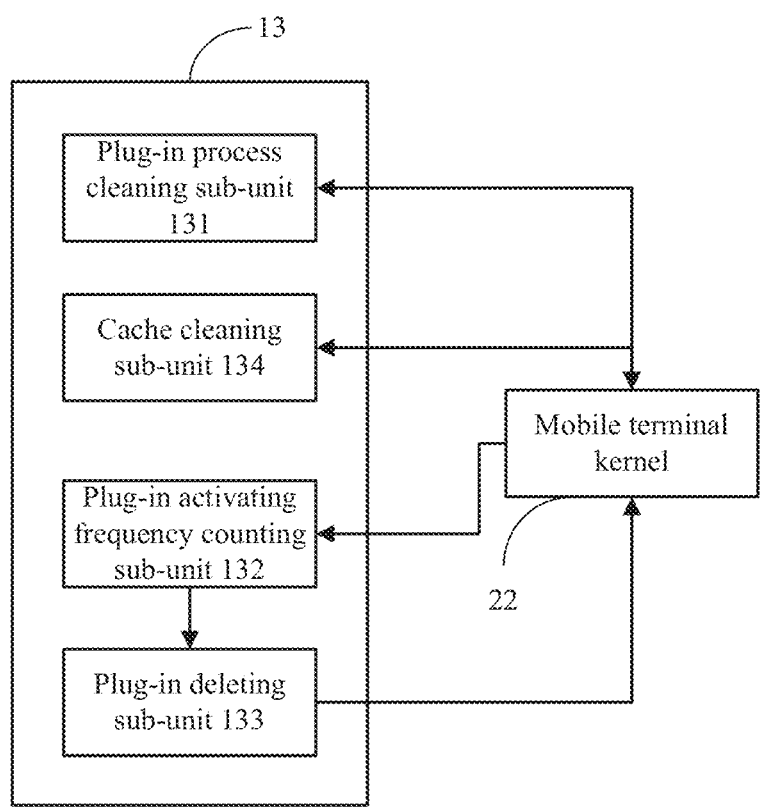
FIG. 2 is a structural block diagram of a management unit of the plug-in management apparatus according to example embodiments of the present disclosure.

FIG. 2 is a structural block diagram of a management unit of a plug-in management apparatus according to the example embodiments of the present disclosure. The management unit 13 may comprise a plug-in process cleaning sub-unit 131, a plug-in activating frequency counting sub-unit 132, a plug-in deleting sub-unit 133, and a cache cleaning sub-unit 134. The management unit 13 may be configured to use the aforementioned sub-units to optimize the management of plug-ins in various application programs.

The plug-in process cleaning sub-unit 131 may be configured to turn off a plug-in being run by an application program (i.e., an active plug-in) that has been in an idle condition for a time longer than a predetermined idle time. The plug-in process cleaning sub-unit 131 may turn off the active plug-in automatically or upon receiving a command from a user of the plug-in management apparatus. The predetermined idle time for different application programs may be the same or may be different. The cache cleaning sub-unit 134 may be configured to clean caches of the mobile terminal used by the active plug-ins based on the quantity of caches used by the active plug-ins and the running time of the active plug-ins in an application program; the plug-in activating frequency counting sub-unit 132 may be configured to collect statistic data of the frequency that a plug-in is used and/or activated. The plug-in deleting sub-unit 133 may be configured to automatically delete a plug-in installed in an application program if the activating frequency of the plug-in is lower than a predetermined frequency. The predetermined frequency for different plug-ins may be the same or may be different.

When the plug-in process cleaning sub-unit 131 is in operation, it may detect timestamp attributes of each plug-in being run by an application program through a task manager of the mobile terminal kernel. Because a timestamp attribute of a plug-in may be updated at each plug-in call (i.e., the timestamp attribute of a plug-in may be updated each time that the plug-in is activated, thereby may be associated with a most recent time that the plug-in was activated), the idle time of that plug-in may be obtained through detecting the timestamp attribute of the plug-in. When the plug-in process cleaning sub-unit 131 detects that the idle time of a plug-in is longer than the predetermined idle time (e.g., as 30 minutes), the plug-in process cleaning sub-unit 131 may turn off the plug-in automatically or upon receiving an command from the user of the plug-in management apparatus. The predetermined idle time may be set by the user of the plug-in management apparatus. The user may also choose whether to install and/or activate the plug-in process cleaning sub-unit 131.

When the cache cleaning sub-unit 134 is in operation, it may detect the quantity of caches used by each active plug-in and the running time of each active plug-in being through the task manager of the mobile terminal kernel. When the cache cleaning sub-unit 134 detects that the quantity of caches used by a plug-in is greater than a predetermined cache quantity (e.g., 20 MB), or the activation time (e.g., the running time) of the plug-in is longer than a predetermined activation time (e.g., 1 week), the cache cleaning sub-unit 134 may clean the caches used by the plug-in so as to release more caches for other application programs and plug-ins. Alternatively, the cache cleaning sub-unit 134 may clean only the caches that are more than the predetermined cache quantity. The predetermined cache quantity may be the same or may be different for different plug-ins. The predetermined running time may be the same or may be different for different plug-ins. Further, the user of the plug-in management apparatus may choose whether to install and/or activate the cache cleaning sub-unit 134.

When the plug-in activating frequency counting sub-unit 132 and the plug-in deleting sub-unit 133 are in operation, the plug-in activating frequency counting sub-unit 132 may detect an frequency (i.e., activating frequency) that a plug-in installed in an application program is activated through a task manager of the mobile terminal kernel. If the activating frequency of the plug-in is lower than a predetermined activating frequency (e.g., 1 time per week), then the frequency that the plug-in is used may be deemed too low, and the plug-in deleting sub-unit 133 may delete the plug-in installed in the application program. The deletion may require confirmation from the user of the plug-in management apparatus. For example, the plug-in management apparatus (e.g., through the plug-in deleting sub-unit 133) may generate a pop up window from the interface, or generate a reminding icon (e.g., red-flag) over a particular plug-in in the interface, reminding that user that the plug-in is not frequently used. No deletion may be conducted without an affirmative action from the user in response to the reminding icon or pop up window. Alternatively, the deletion may be automatic without informing the user of the plug-in management apparatus. Further, the user may be able to determine whether to install and/or activate the plug-in activating frequency counting sub-unit 132 and the plug-in deleting sub-unit 133.

Figure 5:
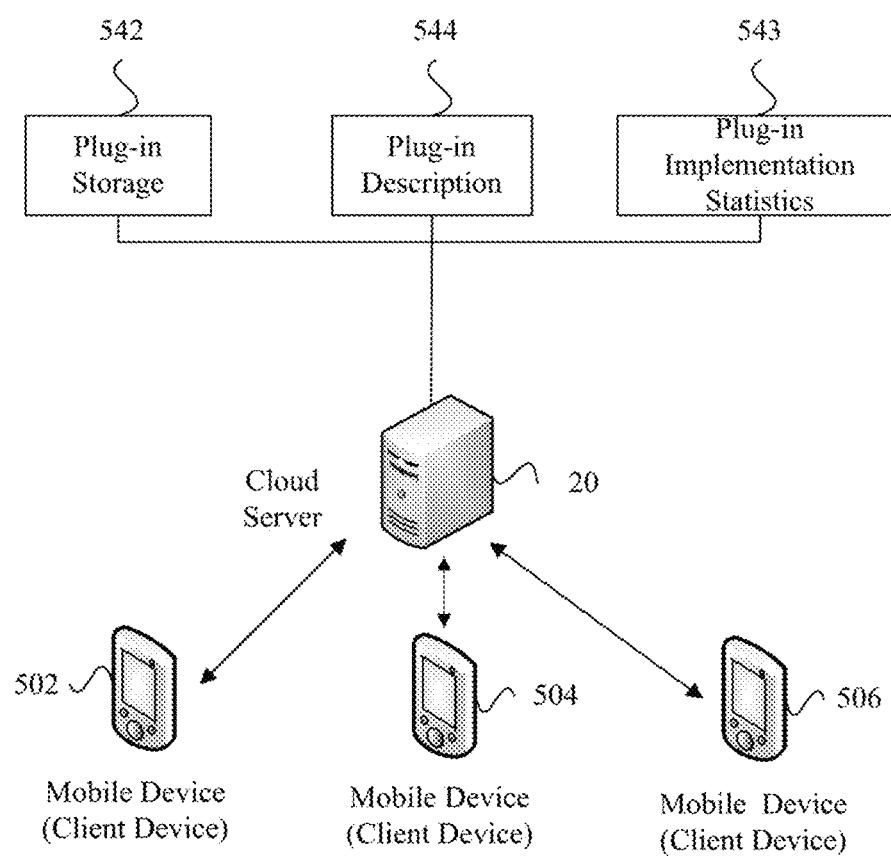
FIG. 5 is a schematic diagram illustrating an example embodiment of a cloud network environment.

Referring back to FIG. 1, according to an example embodiment of the present disclosure, the plug-in management apparatus may further comprise a cloud server 20. The mobile terminal may communicate via an interne with the cloud server 20 through a cloud network. FIG. 5 is a schematic diagram illustrating an example embodiment of a cloud network environment, wherein a plurality of mobile terminals 502, 504, and 506 may connect with the cloud server 20. The cloud server 20 may be a computer and/or mobile terminal device 400 in FIG. 4. The cloud server 20 may also have other form and/or structure that one of ordinary skill in the art at the time of the present disclosure may conceive. The cloud server 20 may comprise various modules providing various services to the mobile terminals 502, 504, and 506. For example, in the cloud server 20, a plug-in storage module 542 may be configured to store and/or provide plug-ins used in the application programs in the mobile terminals 502, 504, 506 and/or another cloud server; a plug-in description module 544 may be configured to receive and/or publish descriptions for each plug-in; and a plug-in implementation statistics module 543 may be configured to collect and/or provide statistic information for implementations of each plug-in.

Referring back to FIG. 1, the local plug-in management module 10 may further comprise a plug-in installation unit 14, a feedback unit 15, and a display unit 16. The cloud server 20 may also comprise an evaluating and statistical unit 21.

The plug-in installation unit 14 may be configured to download and install a plug-in released and/or provided from the cloud server 20. The feedback unit 15 may be configured to provide the cloud server 20 a feedback of implementation results of the installed plug-in in the respective application program. The feedback of implementation results may include, but is not limited to, a score and/or an evaluation and/or review of the installed plug-in, which may be provided by the user of the plug-in management apparatus. Further, the cloud server 20 may communicate with and receive feedbacks of the same plug-in from a plurality of other plug-in management apparatuses. Accordingly, the evaluating and statistical unit 21 of the cloud server 20 may be configured to generate a total score and/or an overall evaluation and/or review of the plug-in based on the scores and/or the evaluations and/or reviews received from the above plug-in management apparatuses. The display unit 16 may be configured to receive and display the total score and/or the overall evaluation and/or review, as well as a description of the plug-in released and/or provided by the cloud server 20.

When the plug-in management apparatus is in use, the plug-in installation unit 14 of the local plug-in management module 10 may download and install a plug-in released and/or provided by the cloud server 20. The user may then provide a score and/or evaluation and/or review to the installed plug-in he/she used. The feedback unit 15 then may send a feedback (e.g., the score, evaluation, and/or review) from the user to the cloud server 20. The cloud server 20 may receive and collect scores, evaluations, and/or reviews of the plug-ins from local plug-in management module 10 (e.g., from local plug-in management modules 10 of different users), and then the evaluating and statistical unit 21 may generate the total score and/or overall evaluation and/or review for the installed plug-in. For example, the total score may be an average of all scores of a plug-in received, and the overall evaluation and/or review may be a total set or random set of all evaluations and/or reviews of a plug-in received. The cloud server 20 may then send the total score and/or overall evaluation and the corresponding description of the plug-in to the display unit 16 of the local plug-in management module 10 to inform the corresponding user of functions and applications of the plug-in. In this way, the cloud server 20 and the local plug-in management module 10 may be able to introduce and/or recommend a plug-in to the users. At the same time, users may also provide to the cloud server 20 feedbacks of implementation results about a plug-in, thus facilitate a plug-in developer in improving the plug-in. According to the example embodiments of the present disclosure, the cloud server 20, the plug-in installation unit 14, the feedback unit 15 and the display unit 16 may all be configured to allow a user to pre-set one or more parameters therein and/or determine whether to install and/or activate one or more of them.

Figure 3:
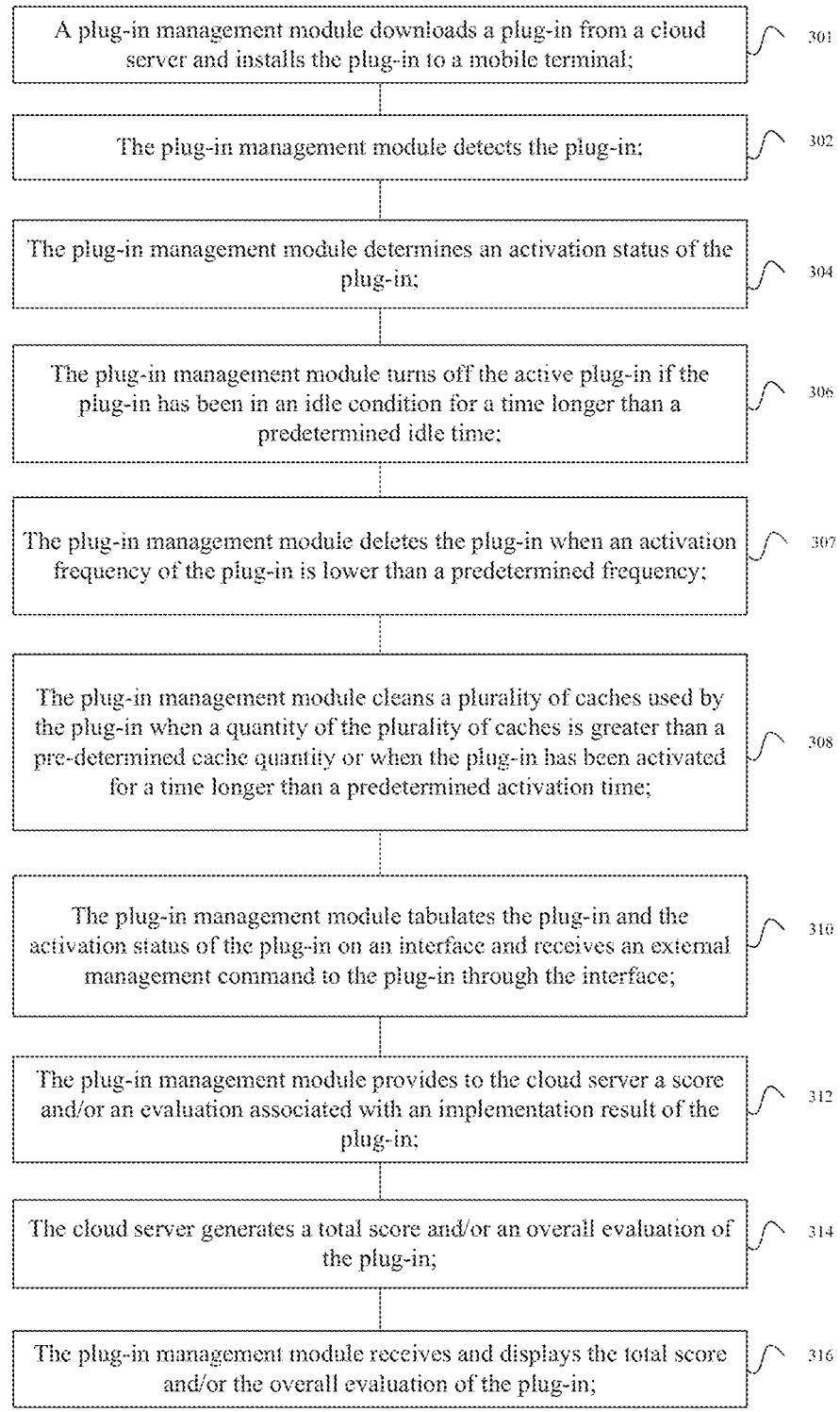
FIG. 3 is a flow chart illustrating a method of plug-in management according to examples of the present disclosure.

FIG. 3 illustrates a method for managing plug-ins installed in a mobile terminal, according to the example embodiments of the present disclosure. In this method, a mobile terminal may comprise a plug-in management module. The mobile terminal may be the computer/mobile terminal device 400 as shown in FIG. 4. The plug-in management module may be hardware disposed in the mobile terminal and may be configured to conduct steps shown in FIG. 3. Alternatively, the plug-in management module may be a software program stored in a storage medium of the mobile terminal and may be configured to be executed on a processor and to direct the mobile terminal (e.g., to direct the processor 422) to conduct the steps shown in FIG. 3.

According to the example embodiments of the present disclosure, the plug-in management module may communicate with a cloud server, wherein the cloud server may be configured to provide plug-ins to the plug-in management module. The cloud server may also connect to a plurality of other plug-in management modules.

In step 301, the plug-in management module may download a plug-in from the cloud server and install the plug-in in an application program of the mobile terminal.

In step 302, the plug-in management module may detect the plug-in being installed in the application program of the mobile terminal The detection of the plug-in may comprise detecting, by the plug-in management module, a name ID of the application program and a name ID of the plug-in through an program manager in a kernel of the mobile terminal. A determining of the activation status of the plug-in may comprise detecting, by the plug-in management module, an operation ID of the plug-in in a task manager of the kernel of the mobile terminal. The name ID of the application program may be a unique identification of the application program; the name ID of the plug-in may be a unique identification of the plug-in; and the operation ID may be a unique identification of the plug-in for all running processes of the mobile terminal In step 304, the plug-in management module may determine an activation status of the plug-in. If the plug-in is active, the plug-in management module may conduct step 306 to turn off the active plug-in if the plug-in has been in an idle condition for a time longer than a predetermined idle time. The determining of the time that the plug-in has been in the idle condition may comprise detecting, by the plug-in management module, a timestamp attribute of the plug-in, wherein the timestamp attribute may be associated with a most recent time that the plug-in was activated.

In step 307, the plug-in management module may determine an activation frequency of the plug-in and delete the plug-in when the activation frequency of the plug-in is lower than a predetermined frequency.

In step 308, the plug-in management module may clean a plurality of caches used by the active plug-in when a quantity of the plurality of caches is greater than a pre-determined cache quantity or when the active plug-in has been activated for a time longer than a predetermined activation time.

In step 310, the plug-in management module may tabulate the plug-in and the activation status of the plug-in on an interface of the plug-in management module. The plug-in management module may also receive an external management command to the plug-in through the interface.

In step 312, the plug-in management module may provide to the cloud server at least one of a score and an evaluation associated with an implementation result of the plug-in. In addition to the at least one score and evaluation received from this plug-in management module, the cloud server may also receive from each of the plurality of other plug-in management modules at least one of a score and an evaluation associated with the implementation result of the plug-in.

In step 314, the cloud server may generate at least one of a total score and overall evaluation of the plug-in, wherein the total score may be based on the received scores and the overall evaluation may be based on the received evaluations. Then the cloud server may send the total score and overall evaluation to the plug-in management module.

In step 316, the plug-in management module may receive and display the at least one total score and the overall evaluation of the plug-in.

Plug-in management apparatuses according to example embodiments of the present disclosure may be configured to comprehensively manage plug-ins and facilitate performances of addition, deletion, look up, giving scores and evaluations of plug-ins of a mobile terminal; detect current running processes of plug-ins of a mobile terminal, automatically turn off corresponding idle process and increase running speed of a mobile terminal; and detect a current quantity of caches used by plug-ins of a mobile terminal and automatically perform cleaning of the caches so as to save storage space of the mobile terminal.

The present disclosure provides example embodiments of plug-in management apparatuses and methods for mobile terminal application. The plug-in management apparatuses may be configured to manage and optimize plug-ins used in mobile terminals, and enhance communications between users and plug-in developers.

While example embodiments of the present disclosure relate to methods and apparatuses of managing plug-ins for a mobile terminal, the methods and apparatus may also be applied to other applications. For example, in addition to mobile terminals, the methods and apparatus may also be applied to non-mobile devices such as a desktop computer, a server of a network, or any devices that may operate an application program with at least one plug-in, etc. The present disclosure intends to cover the broadest scope of plug-in management methods and apparatuses may obtain.

Thus, example embodiments illustrated in FIGS. 1-5 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A plug-in management apparatus comprising:
a processor-readable storage medium comprising a set of instructions for plug-in management;
a processor in communication with the storage medium, wherein when executing the set of instructions, the processor is directed to:
detect a plug-in installed in an application program of a client device;
determine an activation status of the plug-in;
manage the plug-in based on at least one of: the activation status of the plug-in, an idle condition of the plug-in, an activation frequency of the plug-in, a quantity of a plurality of caches used by the plug-in, or a length of time that the plug-in has been activated;
determine at least one of a score or an evaluation associated with an implementation result of the plug-in;
send the least one of the score or the evaluation to a cloud server; and
receive and display at least one of a total score or overall evaluation of the plug-in from the cloud server,
wherein the total score is determined by the cloud server based on the score and scores of the plug-in sent from a plurality of other plug-in management apparatus, and the overall evaluation is determined by the cloud server based on the evaluation and evaluations of the plug-in sent from the plurality of other plug-in management apparatus.

2. The plug-in management apparatus according to claim 1, wherein to detect the plug-in, the processor is further directed to detect a name ID of the application program and a name ID of the plug-in through a program manager in a kernel of the client device, and
wherein to determine the activation status of the plug-in, the processor is further directed to detect an operation ID of the plug-in in a task manager of the kernel of the mobile terminal,
wherein the name ID of the application program is a unique identification of the application program, the name ID of the plug-in is a unique identification of the plug-in, and the operation ID is a unique identification of the plug-in for all running processes of the client device.

3. The plug-in management apparatus according to claim 1, wherein to manage the plug-in, the processor is further directed to:
turn off the plug-in when the plug-in is active and has been in an idle condition for a time longer than a predetermined idle time.

4. The plug-in management apparatus according to claim 3, wherein to determine the time that the plug-in has been in the idle condition, the processor is further directed to:
detect a timestamp attribute of the plug-in, wherein the timestamp attribute is associated with a most recent time that the plug-in was activated.

5. The plug-in management apparatus according to claim 1, wherein to manage the plug-in, the processor is further directed to:
determine the activation frequency of the plug-in; and
delete the plug-in when the activation frequency of the plug-in is lower than a predetermined frequency.

6. The plug-in management apparatus according to claim 1, wherein to manage the plug-in, the processor is further directed to:
clean the plurality of caches used by the plug-in when the quantity of the plurality of caches is greater than a predetermined cache quantity or when the plug-in has been activated for a time longer than a predetermined activation time.

7. The plug-in management apparatus according to claim 6, further comprises an interface; and
wherein to manage the plug-in, the processor is further directed to:
tabulate the plug-in and the activation status of the plug-in on the interface; and
receive an external management command to the plug-in through the interface.

8. The plug-in management apparatus according to claim 1, the processor is further directed to:
establish a communication with a computer server;
download the plug-in from the computer server; and
install the plug-in to the client device.

9. A method for managing plug-ins installed in a client device, the method comprising:
detecting, by the client device, a plug-in being installed in an application program of the client device;
determining, by the client device, an activation status of the plug-in;
managing, by the client device, the plug-in based on at least one of: the activation status of the plug-in, an idle condition of the plug-in, an activation frequency of the plug-in, a quantity of a plurality of caches used by the plug-in, or a length of time that the plug-in has been activated;
determining, by the client device, at least one of a score or an evaluation associated with an implementation result of the plug-in;
sending, the client device, the least one of the score or the evaluation to a cloud server; and
receiving and displaying, by the client device, at least one of a total score or overall evaluation of the plug-in from the cloud server,
wherein the total score is determined by the cloud server based on the score and scores of the plug-in sent from a plurality of other plug-in management apparatus, and the overall evaluation is determined by the cloud server based on the evaluation and evaluations of the plug-in sent from the plurality of other plug-in management apparatus.

10. The method according to in claim 9, wherein the detecting of the plug-in comprises detecting, by the client device, a name ID of the application program and a name ID of the plug-in through a program manager in a kernel of the client device, and
wherein the determining of the activation status of the plug-in comprises detecting, by the client device, an operation ID of the plug-in in a task manager of the kernel of the mobile terminal,
wherein the name ID of the application program is a unique identification of the application program, the name ID of the plug-in is a unique identification of the plug-in, and the operation ID is a unique identification of the plug-in for all running processes of the client device.

11. The method according to in claim 9, wherein the managing of the plug-in comprise:
turning off, by the client device, the plug-in when the plug-in is active and has been in an idle condition for a time longer than a predetermined idle time.

12. The method according to in claim 11, wherein the determining of the time that the plug-in has been in the idle condition comprises detecting, by the client device, a timestamp attribute of the plug-in, wherein the timestamp attribute is associated with a most recent time that the plug-in was activated.

13. The method according to in claim 9, wherein the managing of the plug-in further comprises:
   determining, by the client device, the activation frequency of the plug-in; and
   deleting, by the client device, the plug-in when the activation frequency of the plug-in is lower than a predetermined frequency.

14. The method according to in claim 9, wherein the managing of the plug-in further comprises:
   cleaning, by the client device, the plurality of caches used by the plug-in when the quantity of the plurality of caches is greater than a pre-determined cache quantity or when the plug-in has been activated for a time longer than a predetermined activation time.

15. The method according to in claim 14, wherein the client device comprises an interface; and
   the managing of the plug-in further comprises:
   tabulating, by the client device, the plug-in and the activation status of the plug-in on the interface; and
   receiving, by the client device, an external management command to the plug-in through the interface.

16. The method according to in claim 9, further comprising:
   establishing, by the client device, a communication with the computer server;
   downloading, by the client device, the plug-in from the computer server; and
   installing, by the client device, the plug-in to the client device.

\* \* \* \* \*